(12) United States Patent
Stademann

(10) Patent No.: US 7,130,410 B1
(45) Date of Patent: Oct. 31, 2006

(54) INFORMATION ELEMENT COMPONENT OF A SIGNALING MESSAGE, AND A METHOD FOR CONNECTION CONTROL USING SAME

(75) Inventor: Rainer Stademann, Egmating (DE)

(73) Assignee: Siemens, Aktiengesellschaft, Munich (DE)

( * ) Notice: Subject to any disclaimer, the term of this patent is extended or adjusted under 35 U.S.C. 154(b) by 0 days.

(21) Appl. No.: 09/869,952

(22) PCT Filed: Jan. 5, 2000

(86) PCT No.: PCT/EP00/00051

§ 371 (c)(1),
(2), (4) Date: Oct. 22, 2001

(87) PCT Pub. No.: WO00/42783

PCT Pub. Date: Jul. 20, 2000

(30) Foreign Application Priority Data

Jan. 11, 1999 (EP) .................................. 99100455

(51) Int. Cl.
*H04M 7/00* (2006.01)
(52) U.S. Cl. ...................................... 379/230; 379/229
(58) Field of Classification Search ................. 379/207, 379/230, 229; 370/395.2
See application file for complete search history.

(56) References Cited

U.S. PATENT DOCUMENTS

| 5,610,977 | A | 3/1997 | Williams et al. |
| 5,940,492 | A * | 8/1999 | Galloway et al. ............ 379/230 |
| 5,943,408 | A * | 8/1999 | Chen et al. ............. 379/216.01 |
| 6,175,732 | B1 * | 1/2001 | McDaniel et al. ........... 455/433 |
| 6,772,219 | B1 * | 8/2004 | Shobatake ................... 709/238 |

FOREIGN PATENT DOCUMENTS

WO        WO 97/45975        12/1997

OTHER PUBLICATIONS

XP-002104152 Grundlagen Intelligenter Netze.
XP-002104153 Anwender des TCAP: Intelligent Network Application Procol pp. 212-232.

* cited by examiner

*Primary Examiner*—Rasha S. Al-Aubaidi
(74) *Attorney, Agent, or Firm*—Bell, Boyd & Lloyd LLC

(57) ABSTRACT

The present invention is directed toward permitting an operator to be able to introduce new services and/or service features into his/her network without them needing to have already been provided in advance in the software system of the exchanges by the manufacturer of the exchanges. Disclosed is an information element of a signaling message which is designed such that the services or service features for which it is used can be stipulated during operation using an appropriate administration component.

2 Claims, 5 Drawing Sheets

The schematic service logic

Service logic LE

IF
telephone number starts with 0144
THEN BEGIN
Set bit 1 in GIE of the IAM
Activate supersave tariff T
END

Service logic TE

IF
bit 1 of GIE in IAM is set
THEN BEGIN
Only direct channel routing
Trunk reservation = 10
END

FIG 3

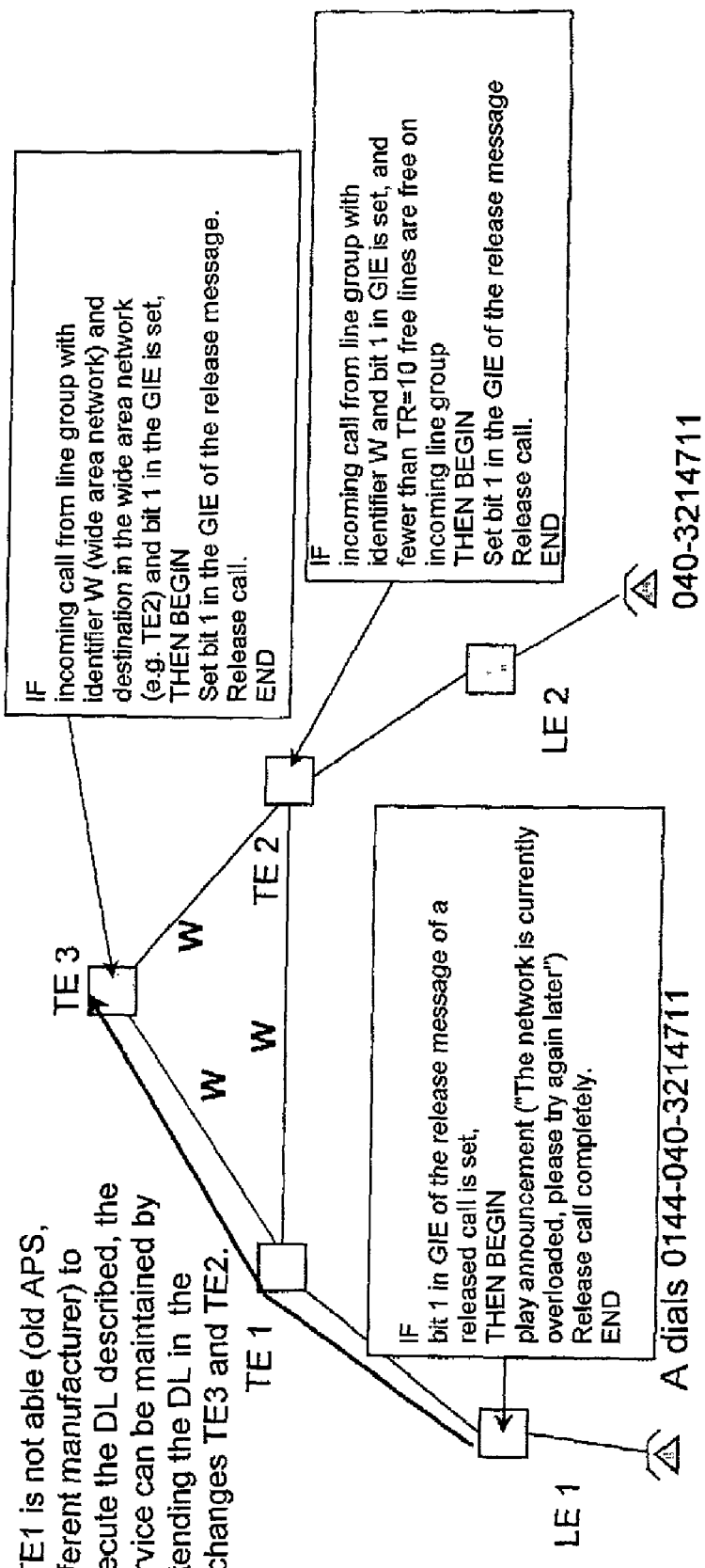

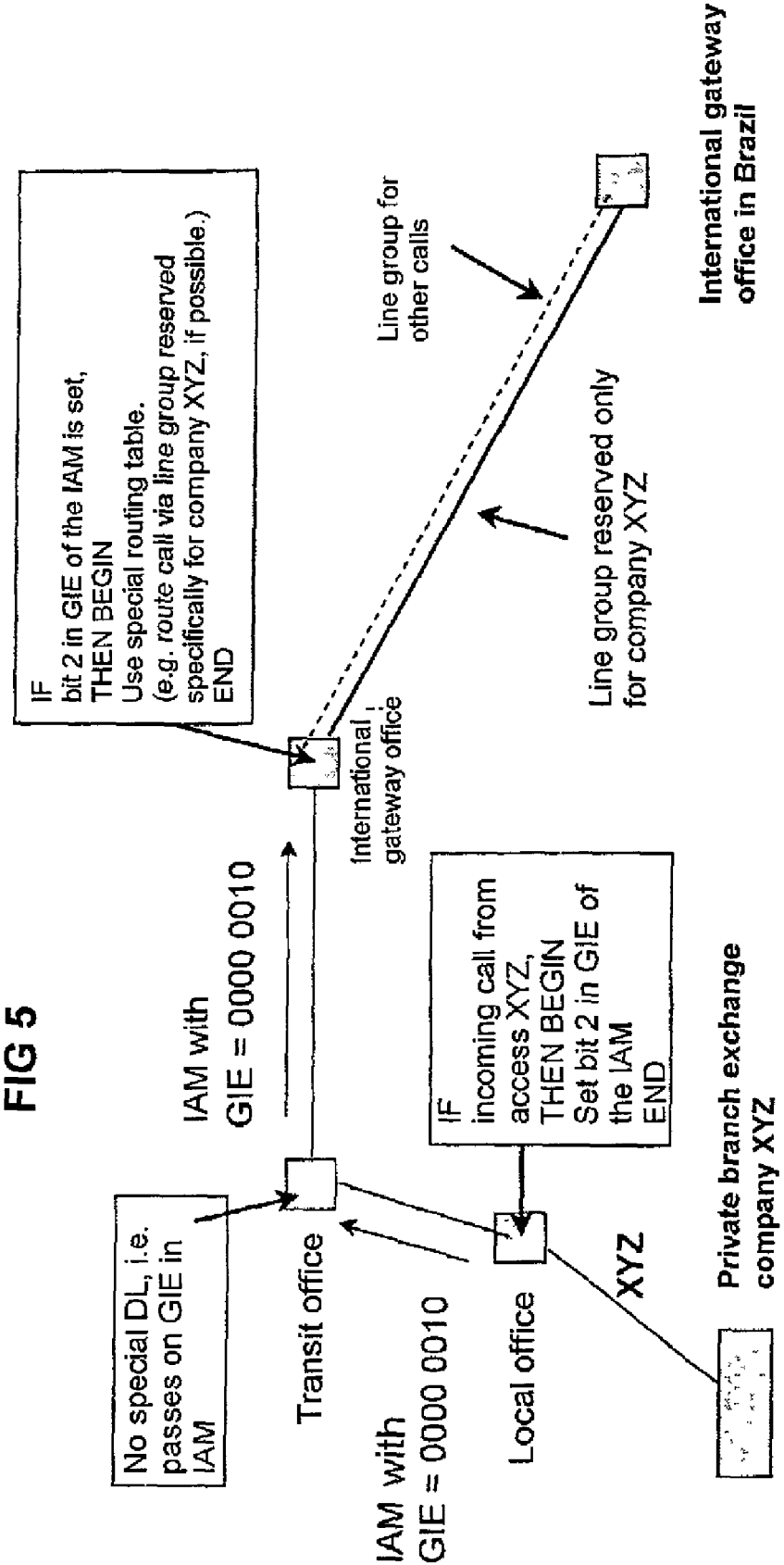

INFORMATION ELEMENT COMPONENT OF A SIGNALING MESSAGE, AND A METHOD FOR CONNECTION CONTROL USING SAME

BACKGROUND OF THE INVENTION

1. Field of the Invention

The present invention relates, generally, to an information element component of a signaling message and a method for connection control using such information element and, more specifically, to such an information element and method wherein an operator is able to introduce new services and/or service features into a network without such services and features needing to already have been provided in advance.

2. Description of the Prior Art

In today's communication networks, such as the telephone network, many (connection-related) services or service features can be introduced only by virtue of a complex change of software in the exchanges (APS change). In many cases, the reason for this is, among other things, that services and service features require alteration of the signaling between the exchanges (interoffice signaling). This change includes extending existing information elements and introducing new information elements or even new messages. However, since the association between an information element of a signaling message and one or more services or service features is stipulated via the APS, the cited change cannot be made without a change of APS.

A previous solution for introducing new service features into a network (without changing the APS in the VST) is to use the IN (Intelligent Network) architecture. For many service features, however, an IN solution is not possible or is too expensive.

The present invention is, therefore, directed toward permitting an operator to be able to introduce new services and/or service features into the network without them needing to have already been provided in advance in the APS by the manufacturer of the exchanges.

SUMMARY OF THE INVENTION

Accordingly, in an embodiment of the present invention, an information element component of a signaling message used for signaling between exchanges in a communication network is provided, which includes: an administration component via which services for which the information element is used can be stipulated during operation; and content values which can be at least one of evaluated and altered, based on a preset value made using the administration component, within the context of processing a connection by an exchange.

In an embodiment, the administration component makes the stipulation by embedding a respective information item for at least one bit position of the information element as a control information item into a connection control of the exchange.

In another embodiment of the present invention, a method is provided for connection control in a communication network wherein the method includes the steps of: using an information element of a signaling message for signaling between exchanges in the communication network; stipulating, during operation, services for which the information element is used; stipulating, during operation, services for which the information element is used; and altering content values of the information element, based on an administrative preset, within the context of processing a connection by an exchange.

In an embodiment of the method, the step of stipulating includes prescribing a respective information item for at least one bit position of the information element as control information for a connection control of the exchange.

In a further embodiment of the present invention, an administration component of an information element of a signaling message used for signaling between exchanges in a communication network is provided, which includes characteristics by which the administration component can be used to impress on a connection control of an exchange, during operation, services for which the information element is used.

In an embodiment, a network operator can use the administration component to embed into a connection control, at prescribed locations, functions which can at least one of alter and evaluate content values of the information element.

In another embodiment of the present invention, a method is provided for connection control in an exchange of a communication network, wherein manipulator functions can be impressed administratively on the connection control at particular execution locations, the manipulator functions prompting actions which can at least one of alter and evaluate content values of information elements of signaling messages.

In yet another embodiment of the present invention, an exchange in a communication network is provided which includes a manipulator function which can be programmed using an administration component, so as to permit the connection control to be influenced administratively.

Additional features and advantages of the present invention are described in, and will be apparent from, the following detailed description of the preferred embodiments and the drawing.

DESCRIPTION OF THE DRAWINGS

FIGS. 1–3 show in schematic form a "supersave tariff" service which can be provided, by way of example, pursuant to the teachings and implementation of the present invention; and FIGS. 4–5 show other services and service features which can be provided by using the present invention.

DETAILED DESCRIPTION OF THE PREFERRED EMBODIMENTS

Figure 1:
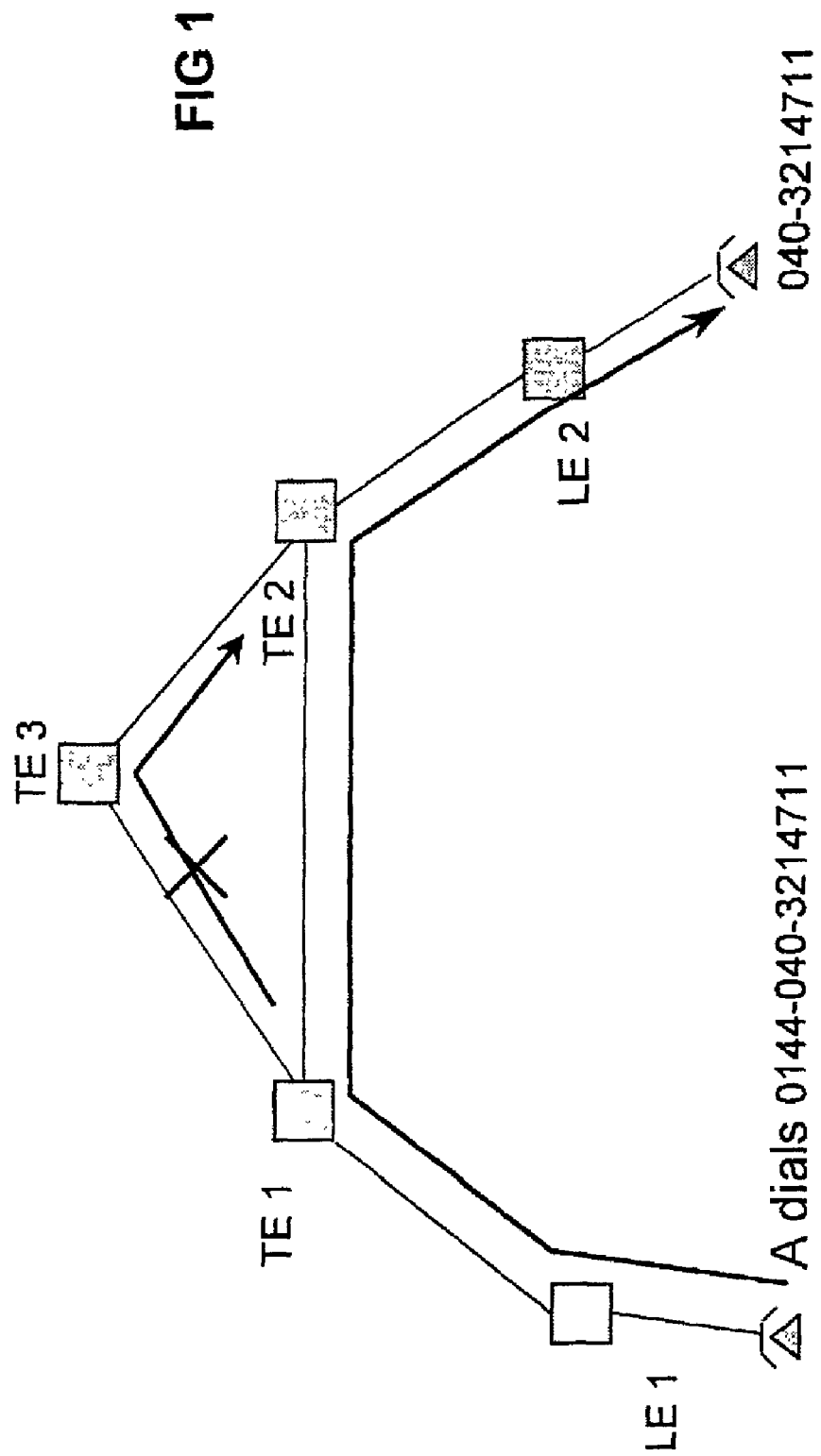

The present invention provides for the introduction of one or more generic information elements into (signaling) messages for interoffice signaling, the messages being exchanged in the context of the connection control between the exchanges in a communication network. The functional significance of a generic information element (GIE) is not stipulated by the APS. This is how GIEs differ from normal nongeneric information elements. By way of example, a generic information element (GIE) can be provided for this purpose in the connection setup message LAM from the ISUP (cf. FIG. 2). Such a GIE may include a (bit) strip of 8, 16, 24 or more bits, for example.

Setup and cleardown of connections is controlled in an exchange by the software program for connection control (part of the APS). So that the operator is able to introduce new service features and/or services into the network without changing the APS, the following functions for processing and evaluating the GIE and for influencing the connection control are provided in addition to the GIE in the exchanges in the network:

a) a write function which connection-related messages can use to write information to the GIE (e.g., setting of individual bits in a bit strip)

b) a read function which connection-related messages can use to specifically read information from the GIE (e.g., testing of individual bits in a bit strip)

c) an administration component which the network operator can use to influence the connection control of a VST.

This administration component can be used by the network operator to embed "manipulator functions" into the connection control at prescribed locations ("points in call", e.g. before or after the digit analysis of the destination telephone number). A manipulator function includes a condition part and an action part.

By way of example, the condition part uses the read function b) to permit the contents of the GIE to be tested for prescribed values. For example, it would be possible to test whether a particular bit (e.g., bit #1) in the GIE of a received connection-related message (e.g., LAM from the ISUP) is set. Furthermore, states of the exchange or states of the connection can be tested in the condition part. For example, it would be possible to test whether the origin of a call is national or international.

The action part of a manipulator function is executed by the APS of the exchange if the condition prescribed in the condition part has been satisfied. Optionally, the action part may itself, in turn, contain complete manipulator functions (interleaving). The action part can be used to alter states of the connection and/or states of the exchange. In this way, the action part influences the connection control. Like the condition part, the action part is stipulated administratively by the network operator.

One example of a specific action is activation of the above write function a) for a GIE containing prescribed information. Another action may be the release of the connection, for example.

Figure 2:
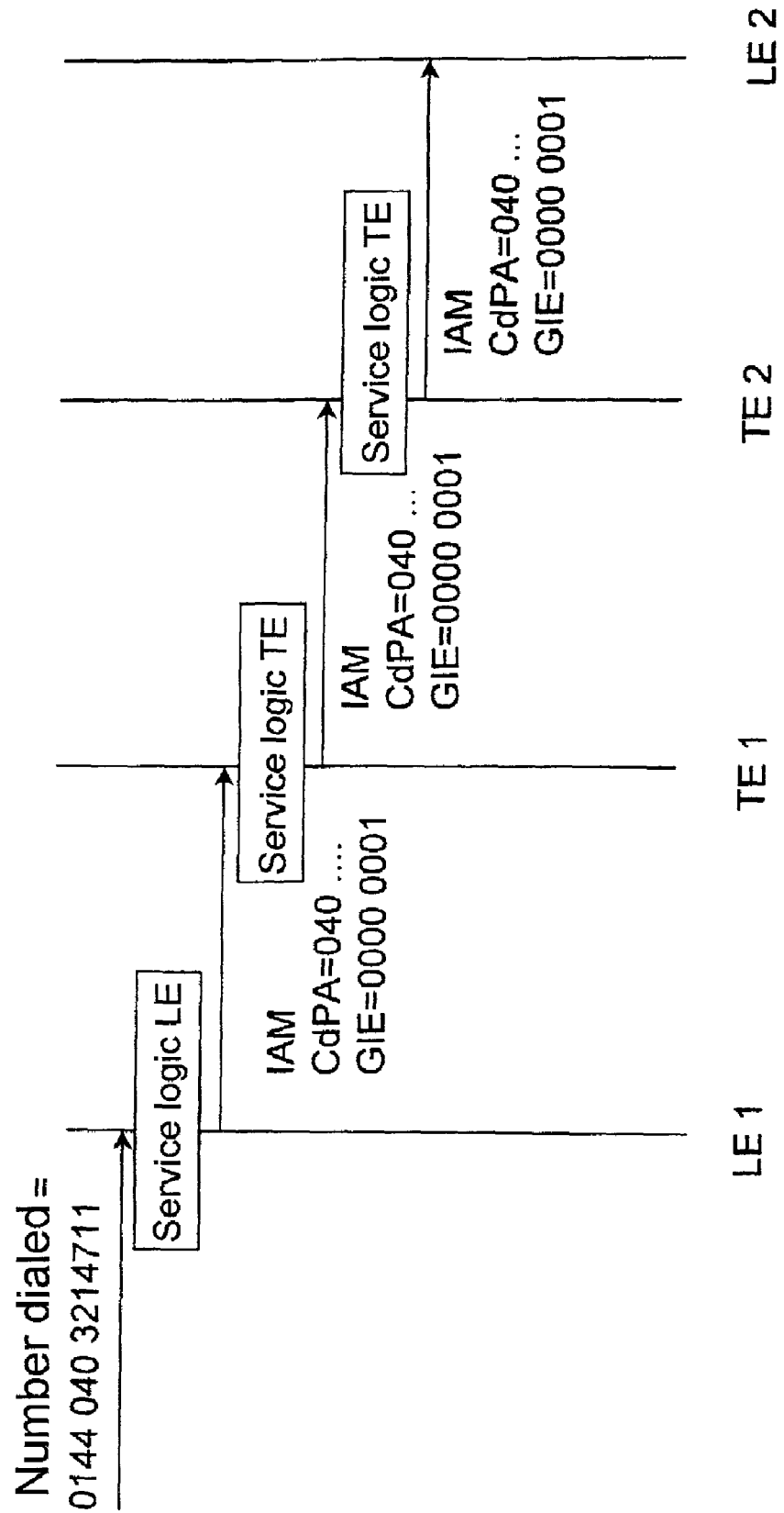

Examples of configurations of manipulator functions are described by the following:

if service code 0144 is dialed, set bit #1 in the GIE of the IAM message for this call (write function) and use tariff T (cf. service example in FIG. 1 to FIG. 3).

If bit #1 in the GIE of the IAM message of a call is set (read function), use only direct channels and, in this context, use line reservation parameter TR=10 (cf. service example in FIG. 1 to FIG. 3).

If a call arrives via line group with identifier W, and bit #1 in the GIE of the IAM is set, release the call and set bit #1 in the GIE of the release message (cf. FIG. 4).

If a call arrives via access in the company XYZ, set bit #2 in the GIE of the IAM for this call (cf. FIG. 5).

The manipulator functions (and bit positions used therein) involved in providing a service implicitly stipulate that service or service feature for which a particular bit position is used. In this way, the whole GIE can be used for a number of services and/or service features.

The cited manipulator functions can be administered in a user-friendly manner by the network operator,; e.g., using a programming language (cf. example in FIG. 3, for example). This allows the network operator to provide new services and/or service features in the network, without them needing to have already been provided in advance by the manufacturer of the exchanges.

The administrability of the cited manipulator functions in an exchange thus makes it possibl.

a) to have information written flexibly into generic information elements in the interoffice signaling in a VST on the basis of state conditions of the VST and of the respective connection, and b) to evaluate information from generic information elements of the interoffice signaling in a VST and to logically combine it flexibly with actions on the basis of state conditions of the VST and of the respective connection.

FIGS. 1–3 show a "supersave tariff" service which can be provided, by way of example, using the present invention. By first dialing the service identifier 0144, a call is routed only via the cheapest channel. The likelihood of blocking is therefore greater than for other calls. In addition, a high trunk reservation parameter ensures that no "valuable" traffic is driven out of the network. By way of compensation, 0144 calls are charged for on the basis of a cheaper tariff T, on the other hand.

Other services and service features which can be provided using the present invention are shown in FIGS. 4 and 5.

In summary, the following can be reiterated:

The present invention uses generic information elements GIE which can be flexibly allocated to new service features; i.e., it is possible to administratively stipulate for a GIE, without any change of APS, those further new services or service features to be added for which the GIE or parts of the GIE (e.g., individual bit positions) is/are used. The effect achieved by this is that it is not necessary to change the protocol for interoffice signaling.

The present invention makes it possible to provide a category of services which require information to be exchanged between the exchanges, and connection control to be influenced by the exchanges themselves.

The present invention allows the connection control of a VST to be influenced without changing the APS, i.e. during operation of the VST, and thereby makes it possible to introduce new connection-related services or service features.

Although the present invention has been described with reference to specific embodiments, those of skill in the art will recognize the changes may be made thereto without department from the spirit and scope of the present invention as set forth in the hereafter appended claims.

I claim as my invention:

1. A method for call control in an exchange of a communication network, the method comprising the steps of:
   using informational element of a signaling message for signaling between exchanges in the communication network;
   embedding at least one dynamic administrative function to the call control of the exchange at predetermined locations, wherein the dynamic administrative function becomes part of the call control during the operation of the exchange;
   evaluating, based on said at least one administrative function, at least one content value of the information element contained in the signaling message; and
   altering, based on said at least one dynamic administrative function, at least one content value of the informational element contained in the at least one signaling message, wherein the step of altering the content value in turn alters an operational characteristic of the informational element related to the call control.

2. An apparatus for call control in an exchange of a communication network, comprising:
   means for using informational element of a signaling message for signaling between exchanges in the communication network;
   means for embedding at least one dynamic administrative function to the call control of the exchange at predetermined locations, wherein the dynamic administrative function becomes part of the call control during the operation of the exchange;

means for evaluating, based on said at least one administrative function, at least one content value of the information element contained in the signaling message; and means for altering, based on said at least one dynamic administrative function, at least one content value of the informational element contained in the at least one signaling message, wherein altering the content value in turn alters an operational characteristic of the informational element related to the call control.

* * * * *